United States Patent
Nanu et al.

(10) Patent No.: US 8,970,770 B2
(45) Date of Patent: Mar. 3, 2015

(54) CONTINUOUS AUTOFOCUS BASED ON FACE DETECTION AND TRACKING

(75) Inventors: Florin Nanu, Bucharest (RO); Cosmin Nicolae Stan, Bucharest (RO); Peter Corcoran, Claregalway (IE)

(73) Assignee: Fotonation Limited, Ballybrit, Galway (IE)

(*) Notice: Subject to any disclaimer, the term of this patent is extended or adjusted under 35 U.S.C. 154(b) by 531 days.

(21) Appl. No.: 12/959,320

(22) Filed: Dec. 2, 2010

(65) Prior Publication Data

US 2012/0075492 A1 Mar. 29, 2012

Related U.S. Application Data

(60) Provisional application No. 61/387,449, filed on Sep. 28, 2010.

(51) Int. Cl.
*H04N 5/232* (2006.01)

(52) U.S. Cl.
CPC ........ *H04N 5/23212* (2013.01); *H04N 5/23219* (2013.01)
USPC ........... 348/345; 348/349; 348/353; 348/354; 348/355; 348/356

(58) Field of Classification Search
None
See application file for complete search history.

(56) References Cited

U.S. PATENT DOCUMENTS

| | | |
|---|---|---|
| 4,448,510 A | 5/1984 | Murakoshi |
| 5,926,212 A | 7/1999 | Kondo |
| 6,122,004 A | 9/2000 | Hwang |
| 6,246,790 B1 | 6/2001 | Huang et al. |
| 6,407,777 B1 | 6/2002 | DeLuca |
| 6,747,690 B2 | 6/2004 | Molgaard |
| 6,934,087 B1 | 8/2005 | Gutierrez et al. |
| 7,113,688 B2 | 9/2006 | Calvet et al. |

(Continued)

FOREIGN PATENT DOCUMENTS

| | | |
|---|---|---|
| EP | 2037320 A1 | 3/2009 |
| WO | 2007/093199 A2 | 8/2007 |

(Continued)

OTHER PUBLICATIONS

PCT Communication in Cases for Which No Other Form is Applicable, Form PCT/ISA/224, for PCT Application No. PCT/EP2011/069904, dated Jun. 22, 2012, 1 Page.

(Continued)

*Primary Examiner* — Aung S Moe
*Assistant Examiner* — John H Morehead, III
(74) *Attorney, Agent, or Firm* — Hickman Palermo Truong Becker Bingham Wong LLP (57) ABSTRACT

An autofocus method includes acquiring an image of a scene that includes one or more out of focus faces and/or partial faces. The method includes detecting one or more of the out of focus faces and/or partial faces within the digital image by applying one or more sets of classifiers trained on faces that are out of focus. One or more sizes of the one or more respective out of focus faces and/or partial faces is/are determined within the digital image. One or more respective depths is/are determined to the one or more out of focus faces and/or partial faces based on the one or more sizes of the one of more faces and/or partial faces within the digital image. One or more respective focus positions of the lens is/are adjusted to focus approximately at the determined one or more respective depths.

30 Claims, 10 Drawing Sheets

(56) References Cited

U.S. PATENT DOCUMENTS

| | | |
|---|---|---|
| 7,266,272 B1 | 9/2007 | Calvet et al. |
| 7,269,292 B2 | 9/2007 | Steinberg |
| 7,315,630 B2 | 1/2008 | Steinberg et al. |
| 7,315,631 B1 | 1/2008 | Corcoran et al. |
| 7,317,815 B2 | 1/2008 | Steinberg et al. |
| 7,345,827 B1 | 3/2008 | Tang et al. |
| 7,359,130 B1 | 4/2008 | Calvet |
| 7,359,131 B1 | 4/2008 | Gutierrez et al. |
| 7,362,368 B2 * | 4/2008 | Steinberg et al. ............ 348/349 |
| 7,403,344 B2 | 7/2008 | Xu et al. |
| 7,403,643 B2 | 7/2008 | Ianculescu et al. |
| 7,440,593 B1 | 10/2008 | Steinberg et al. |
| 7,460,694 B2 | 12/2008 | Corcoran et al. |
| 7,460,695 B2 | 12/2008 | Steinberg et al. |
| 7,466,866 B2 | 12/2008 | Steinberg |
| 7,469,055 B2 | 12/2008 | Corcoran et al. |
| 7,469,071 B2 | 12/2008 | Drimbarean et al. |
| 7,471,846 B2 | 12/2008 | Steinberg et al. |
| 7,477,400 B2 | 1/2009 | Gutierrez et al. |
| 7,477,842 B2 | 1/2009 | Gutierrez |
| 7,495,852 B2 | 2/2009 | Gutierrez |
| 7,515,362 B1 | 4/2009 | Gutierrez et al. |
| 7,515,740 B2 | 4/2009 | Corcoran et al. |
| 7,518,635 B2 | 4/2009 | Kawahara et al. |
| 7,545,591 B1 | 6/2009 | Tong et al. |
| 7,551,754 B2 | 6/2009 | Steinberg et al. |
| 7,551,755 B1 | 6/2009 | Steinberg et al. |
| 7,555,148 B1 | 6/2009 | Steinberg et al. |
| 7,555,210 B2 | 6/2009 | Calvet |
| 7,558,408 B1 | 7/2009 | Steinberg et al. |
| 7,560,679 B1 | 7/2009 | Gutierrez |
| 7,564,994 B1 | 7/2009 | Steinberg et al. |
| 7,565,030 B2 | 7/2009 | Steinberg et al. |
| 7,565,070 B1 | 7/2009 | Gutierrez |
| 7,574,016 B2 | 8/2009 | Steinberg et al. |
| 7,583,006 B2 | 9/2009 | Calvet et al. |
| 7,587,068 B1 | 9/2009 | Steinberg et al. |
| 7,606,417 B2 | 10/2009 | Steinberg et al. |
| 7,616,233 B2 | 11/2009 | Steinberg et al. |
| 7,620,218 B2 | 11/2009 | Steinberg et al. |
| 7,630,527 B2 | 12/2009 | Steinberg et al. |
| 7,634,109 B2 | 12/2009 | Steinberg et al. |
| 7,640,803 B1 | 1/2010 | Gutierrez et al. |
| 7,646,969 B2 | 1/2010 | Calvet et al. |
| 7,660,056 B1 | 2/2010 | Tang et al. |
| 7,663,289 B1 | 2/2010 | Gutierrez |
| 7,663,817 B1 | 2/2010 | Xu et al. |
| 7,680,342 B2 | 3/2010 | Steinberg et al. |
| 7,684,630 B2 | 3/2010 | Steinberg |
| 7,692,696 B2 | 4/2010 | Steinberg et al. |
| 7,693,311 B2 | 4/2010 | Steinberg et al. |
| 7,693,408 B1 | 4/2010 | Tsai et al. |
| 7,697,829 B1 | 4/2010 | Gutierrez et al. |
| 7,697,831 B1 | 4/2010 | Tsai et al. |
| 7,697,834 B1 | 4/2010 | Tsai |
| 7,702,136 B2 | 4/2010 | Steinberg et al. |
| 7,702,226 B1 | 4/2010 | Gutierrez |
| 7,715,597 B2 | 5/2010 | Costache et al. |
| 7,729,601 B1 | 6/2010 | Tsai |
| 7,729,603 B2 | 6/2010 | Xu et al. |
| 7,747,155 B1 | 6/2010 | Gutierrez |
| 7,769,281 B1 | 8/2010 | Gutierrez |
| 7,792,335 B2 | 9/2010 | Steinberg et al. |
| 7,796,816 B2 | 9/2010 | Steinberg et al. |
| 7,796,822 B2 | 9/2010 | Steinberg et al. |
| 8,212,882 B2 | 7/2012 | Florea et al. |
| 2001/0026632 A1 * | 10/2001 | Tamai ............................ 382/116 |
| 2004/0090551 A1 | 5/2004 | Yata |
| 2005/0270410 A1 | 12/2005 | Takayama |
| 2006/0140455 A1 | 6/2006 | Costache et al. |
| 2006/0204034 A1 | 9/2006 | Steinberg et al. |
| 2006/0239579 A1 | 10/2006 | Ritter |
| 2007/0030381 A1 | 2/2007 | Maeda |
| 2007/0110305 A1 | 5/2007 | Corcoran et al. |
| 2007/0160307 A1 | 7/2007 | Steinberg et al. |
| 2007/0201725 A1 | 8/2007 | Steinberg et al. |
| 2007/0269108 A1 | 11/2007 | Steinberg et al. |
| 2007/0285528 A1 | 12/2007 | Mise et al. |
| 2007/0296833 A1 | 12/2007 | Corcoran et al. |
| 2008/0013798 A1 | 1/2008 | Ionita et al. |
| 2008/0013799 A1 | 1/2008 | Steinberg et al. |
| 2008/0043121 A1 | 2/2008 | Prilutsky et al. |
| 2008/0143854 A1 | 6/2008 | Steinberg et al. |
| 2008/0175481 A1 | 7/2008 | Petrescu et al. |
| 2008/0205712 A1 | 8/2008 | Ionita et al. |
| 2008/0218868 A1 | 9/2008 | Hillis et al. |
| 2008/0219517 A1 | 9/2008 | Blonk et al. |
| 2008/0219581 A1 | 9/2008 | Albu et al. |
| 2008/0220750 A1 | 9/2008 | Steinberg et al. |
| 2008/0252773 A1 * | 10/2008 | Oishi ............................ 348/347 |
| 2008/0259176 A1 | 10/2008 | Tamaru |
| 2008/0266419 A1 | 10/2008 | Drimbarean et al. |
| 2008/0267461 A1 | 10/2008 | Ianculescu et al. |
| 2008/0292193 A1 | 11/2008 | Bigioi |
| 2008/0309769 A1 | 12/2008 | Albu et al. |
| 2008/0316328 A1 | 12/2008 | Steinberg et al. |
| 2009/0002514 A1 | 1/2009 | Steinberg et al. |
| 2009/0003661 A1 | 1/2009 | Ionita et al. |
| 2009/0003708 A1 | 1/2009 | Steinberg et al. |
| 2009/0040342 A1 | 2/2009 | Drimbarean et al. |
| 2009/0052749 A1 | 2/2009 | Steinberg et al. |
| 2009/0052750 A1 | 2/2009 | Steinberg et al. |
| 2009/0059061 A1 * | 3/2009 | Yu et al. ........................ 348/347 |
| 2009/0080713 A1 | 3/2009 | Bigioi et al. |
| 2009/0087042 A1 | 4/2009 | Steinberg et al. |
| 2009/0153725 A1 | 6/2009 | Kawahara |
| 2009/0167893 A1 | 7/2009 | Susanu et al. |
| 2009/0179998 A1 | 7/2009 | Steinberg et al. |
| 2009/0179999 A1 | 7/2009 | Albu et al. |
| 2009/0185753 A1 | 7/2009 | Albu et al. |
| 2009/0190803 A1 | 7/2009 | Neghina et al. |
| 2009/0196466 A1 | 8/2009 | Capata et al. |
| 2009/0208056 A1 | 8/2009 | Corcoran et al. |
| 2009/0238410 A1 | 9/2009 | Corcoran et al. |
| 2009/0238419 A1 | 9/2009 | Steinberg et al. |
| 2009/0238487 A1 | 9/2009 | Nakagawa |
| 2009/0244296 A1 | 10/2009 | Petrescu et al. |
| 2009/0245693 A1 | 10/2009 | Steinberg et al. |
| 2009/0263022 A1 | 10/2009 | Petrescu et al. |
| 2009/0268080 A1 | 10/2009 | Song et al. |
| 2009/0273685 A1 | 11/2009 | Ciuc et al. |
| 2009/0303342 A1 | 12/2009 | Corcoran et al. |
| 2009/0303343 A1 | 12/2009 | Drimbarean et al. |
| 2009/0310885 A1 | 12/2009 | Tamaru |
| 2010/0014721 A1 | 1/2010 | Steinberg et al. |
| 2010/0039525 A1 | 2/2010 | Steinberg et al. |
| 2010/0054533 A1 | 3/2010 | Steinberg et al. |
| 2010/0054549 A1 | 3/2010 | Steinberg et al. |
| 2010/0060727 A1 | 3/2010 | Steinberg et al. |
| 2010/0066822 A1 | 3/2010 | Steinberg et al. |
| 2010/0085436 A1 | 4/2010 | Ohno |
| 2010/0092039 A1 | 4/2010 | Steinberg et al. |
| 2010/0128163 A1 | 5/2010 | Nagasaka et al. |
| 2010/0141786 A1 | 6/2010 | Bigioi et al. |
| 2010/0141787 A1 | 6/2010 | Bigioi et al. |
| 2010/0165140 A1 | 7/2010 | Steinberg |
| 2010/0165150 A1 | 7/2010 | Steinberg et al. |
| 2010/0182458 A1 | 7/2010 | Steinberg et al. |
| 2010/0188525 A1 | 7/2010 | Steinberg et al. |
| 2010/0188530 A1 | 7/2010 | Steinberg et al. |
| 2010/0188535 A1 | 7/2010 | Kurata et al. |
| 2010/0194869 A1 | 8/2010 | Matsuzaki |
| 2010/0202707 A1 | 8/2010 | Costache |
| 2010/0208091 A1 * | 8/2010 | Chang ........................ 348/222.1 |
| 2010/0220899 A1 | 9/2010 | Steinberg et al. |
| 2010/0271494 A1 | 10/2010 | Miyasako |
| 2010/0283868 A1 | 11/2010 | Clark et al. |
| 2010/0329582 A1 | 12/2010 | Albu et al. |
| 2011/0135208 A1 | 6/2011 | Atanassov et al. |
| 2011/0249173 A1 | 10/2011 | Li et al. |
| 2012/0120269 A1 | 5/2012 | Capata et al. |

(56) References Cited

U.S. PATENT DOCUMENTS

| | | | |
|---|---|---|---|
| 2012/0120283 A1 | 5/2012 | Capata et al. | |
| 2012/0218461 A1* | 8/2012 | Sugimoto | 348/349 |
| 2013/0027536 A1* | 1/2013 | Nozaki et al. | 348/77 |

FOREIGN PATENT DOCUMENTS

| | | |
|---|---|---|
| WO | 2009/036793 A1 | 3/2009 |
| WO | 2012/041892 A1 | 4/2012 |
| WO | 2012/062893 A2 | 5/2012 |
| WO | 2012/062893 A3 | 7/2012 |

OTHER PUBLICATIONS

PCT Notification of Transmittal of the International Search Report and the Written Opinion of the International Searching Authority, or the Declaration, for PCT Application No. PCT/EP2011/069904, report dated Jun. 22, 2012, 21 Pages.

Karen P Hollingsworth, Kevin W. Bowyer, Patrick J. Flynn: "Image Averaging for Improved Iris Recognition", Advances in Biometrics, by M. Tistarelli, M.S. Nixon (Eds.): ICB 2009, LNCS 5558, Springer Berlin Heidelberg, Berlin Heidelberg, Jun. 2, 2009, pp. 1112-1121, XP019117900, ISBN: 978-3-642-01792-6.

Sang Ku Kim, Sang Rae Park and Joan Ki Paik: Simultaneous Out-Of-Focus Blur Estimation and Restoration for Digital Auto-Focusing System, Aug. 1, 1998, vol. 44, No. 3, pp. 1071-1075, XP011083715.

Hamm P., Schulz J. and Englmeier K.-H.: "Content-Based Autofocusing in Automated Microscopy", Image Analysis Stereology, vol. 29, Nov. 1, 2010, pp. 173-180, XP002677721.

PCT Notification of the Transmittal of the International Search Report and the Written Opinion of the International Search Authority, or the Declaration, for PCT Application No. PCT/EP2011/066835, report dated Jan. 18, 2012, 12 Pages.

Co-pending U.S. Appl. No. 12/944,701, filed Nov. 11, 2010.
Co-pending U.S. Appl. No. 12/944,703, filed Nov. 11, 2010.
Co-pending U.S. Appl. No. 13/020,805, filed Feb. 3, 2011.

PCT Notification of Transmittal of the International Search Report and the Written Opinion of the International Searching Authority, or the Declaration, for PCT Application No. PCT/EP2011/069904, report dated May 16, 2012, 17 Pages.

Sinjini Mitra, Marios Savvides, Gaussian Mixture Models Based on the Frequency Spectra for Human Identification and Illumination Classification, 4th IEEE Workshop on Automatic Identification Advanced Technologies, 2005, Buffalo, NY, USA Oct. 17-18, 2005, pp. 245-250.

Kouzani, A Z, Illumination-effects compensation in facial images, IEEE International Conference on Systems, Man, and Cybernetics, 1999, IEEE SMS '99 Conference Proceedings, Tokyo, Japan Oct. 12-15, 1999, vol. 6, pp. 840-844.

Matthew Turk, Alex Pentland, Eigenfaces for Recognition, Journal of Cognitive Neuroscience, 1991, vol. 3, Issue 1, pp. 71-86.

H. Lai, P. C. Yuen, and G. C. Feng, Face recognition using holistic Fourier invariant features, Pattern Recognition, 2001, vol. 34, pp. 95-109, 2001. Retrieved from URL: http://digitalimaging.inf.brad.ac.uk/publication/pr34-1.pdf.

Jing Huang, S. Ravi Kumar, Mandar Mitra, Wei-Jing Zhu, Ramin Zabih, Image Indexing Using Color Correlograms, IEEE Conf. Computer Vision and Pattern Recognition, (CVPR '97) pp. 762-768, 1997.

Markus Stricker and Markus Orengo, Similarity of color images, SPIE Proc., vol. 2420, pp. 381-392, 1995.

Ronny Tjahyadi, Wanquan Liu, Svetha Venkatesh, Application of the DCT Energy Histogram for Face Recognition, in Proceedings of the 2nd International Conference on Information Technology for Application (ICITA 2004), 2004, pp. 305-310.

S. J. Wan, P. Prusinkiewicz, S. L. M. Wong, Variance-based color image quantization for frame buffer display, Color Research and Application, vol. 15, No. 1, pp. 52-58, 1990.

Tianhorng Chang and C.-C. Jay Kuo, Texture Analysis and Classification with Tree-Structured Wavelet Transform, IEEE Trans. Image Processing, vol. 2. No. 4, Oct. 1993, pp. 429-441.

Zhang Lei, Lin Fuzong, Zhang Bo, A CBIR method based on color-spatial feature. IEEE Region 10th Ann. Int. Conf. 1999, TENCON'99, Cheju, Korea, 1999.

Wikipedia reference: Autofocus, retrieved on Feb. 3, 2011, URL: http://en.wikipedia.org/wiki/Autofocus, 5 Pages.

Wei Huang, Zhongliang Ling, Evaluation of focus measures in multi-focus image fusion, Pattern Recognition Letters, 2007, 28 (4), 493-500.

Mahsen Ebrahimi Maghaddam, Out of focus blur estimation using genetic algorithm, in Proc. 15th International Conf. on Systems, Signals and Image Processing, IWSSIP 2008, 417-420.

Mahsen Ebrahimi Maghaddam, Out of Focus Blur Estimation Using Genetic Algorithm, Journal of Computer Science, 2008, Science Publications, vol. 4 (4), ISSN 1549-3636, pp. 298-304.

Ken Sauer and Brian Schwartz, Efficient Block Motion Estimation Using Integral Projections, IEEE Trans. Circuits, Systems for video Tech, 1996, pp. 513-518, vol. 6—Issue 5.

Sang-Yong Lee, Jae-Tack Yoo, Yogendera Kumar, and Soo-Won Kim, Reduced Energy-Ratio Measure for Robust Autofocusing in Digital Camera, IEEE Signal Processing Letters, vol. 16, No. 2, Feb. 2009, pp. 133-136.

Jaehwan Jeon, Jinhee Lee, and Joonki Paik, Robust Focus Measure for Unsupervised Auto-Focusing Based on Optimum Discrete Cosine Transform Coefficients, IEEE Transactions on Consumer Electronics, vol. 57, No. 1, Feb. 2011, pp. 1-5.

Aaron Deever, In-Camera All-Digital Video Stabilization, ICIS '06 International Congress of Imaging Science, Final Program and Proceedings, Society for Imaging Science and Technology, pp. 190-193.

Felix Albu, Corneliu Florea, Adrian Zamfir, Alexandru Drimbarean, 10.4-3 Low Complexity Global Motion Estimation Techniques for Image Stabilization, IEEE, Aug. 2008, pp. 1-4244-1459.

Masahiro Watanabe, Shree K. Nayar: Short Papers Telecentric Optics for Focus Analysis, IEEE Transactions on Pattern Analysis and Machine Intelligence, vol. 19, No. 12, Dec. 1997, pp. 1360-1365.

A. Ben Hamza, Yun He, Hamid Krim, and Alan Willsky: A multiscale approach to pixel-level image fusion, Integrated Computer-Aided Engineering, IOS Press, No. 12, 2005 pp. 135-146.

Paul Viola and Michael Jones: Rapid Object Detection Using a Boosted Cascade of Simple Features, Mitsubishi Electric Research Laboratories, Inc., 2004, TR-2004-043 May 2004, 13 pages.

Non-Final Rejection, dated Apr. 17, 2013, for U.S. Appl. No. 12/944,701, filed Nov. 11, 2010.

Non-Final Rejection, dated Apr. 15, 2013, for U.S. Appl. No. 12/944,703, filed Nov. 11, 2010.

PCT Notification of Transmittal of International Preliminary Report on Patentability Chapter I, International Preliminary Report on Patentability Chapter I, for PCT Application No. PCT/EP2011/066835, report dated Apr. 11, 2013, 9, Pages.

Non-Final Rejection, dated Apr. 5, 2013, for U.S. Appl. No. 13/020,805, filed Feb. 3, 2011.

Notice of Allowance, dated Jul. 10, 2013, for U.S. Appl. No. 13/020,805, filed Feb. 3, 2011.

\* cited by examiner

Figure 1

Continuous Focus Tracking

- Face Detect AF knows if a subject has moved in front/back focus by analyzing the change in face size (larger=front, smaller=back)
- This allows Face Detect AF to track a face as it moves closer/further from the camera

Face Detect AF – Key Aspect Example

The subject is 1m far from the camera. The focusing is done at 1m on the left image and at 0.2m on the right image. In each case the face was detected correctly. The yellow rectangle is the output of the face detector.

Distance to the subject: 1m
Distance to the focal plane: 1m

Figure 3A

Distance to the subject: 1m
Distance to the focal plane: 0.2m

Figure 3B

Face Detect AF – Key Aspect – Another Example

Distance to the subject: 0.5m
Distance to the focal plane: 0.5m

Figure 4A

Distance to the subject: 0.5m
Distance to the focal plane: 2.5m

Focus distance from Face Size

- Human face is an object of roughly constant size: 15 cm

- Given face size and lens focal distance the distance to subject can be estimated $P$ – average human face size (150 mm)
$P'$ – size of the face projection onto the sensor
$P''$ – size in pixels of the detected face
$f_{35}$ – 35mm equivalent focal length
$D$ – distance to subject
$I_w$ – image resolution in pixels (horizontal)
$S_w$ – sensor width in mm (36 mm for full frame sensor)

$$\left. \begin{array}{l} \dfrac{P'}{P} = \dfrac{f_{35}}{D} \Rightarrow D = \dfrac{P \cdot f_{35}}{P'} \\ P' = \dfrac{P''}{I_w} S_w \end{array} \right| \Rightarrow D = \dfrac{150 \cdot f_{35} \cdot I_w}{P'' \cdot 36}$$

Figure 7

Focus distance from Face Size – Example 1

The first line of the table contains the estimated (computed) distance to the object (face) based on the face size accordingly with the previous formula

| | |
|---|---|
| Dobj [m] estimated | 1.1 |
| Dobj [m] measured | 1 |
| Dfp [m] | 1 |
| f [mm] | 14 |
| f35 [mm] | 76.5625 |
| Iw [pixels] | 2816 |
| P [mm] | 140 |
| P'' [pixels] | 733 |

Figure 8A

Focus distance from Face Size – Example 1

The first line of the table contains the estimated (computed) distance to the object (face) based on the face size accordingly with the previous formula

| | |
|---|---|
| Dobj [m] computed | 1.1 |
| Dobj [m] measured | 1 |
| Dfp [m] | 0.2 |
| f [mm] | 14 |
| f35 [mm] | 76.5625 |
| Iw [pixels] | 2816 |
| P [mm] | 140 |
| P'' [pixels] | 733 |

CONTINUOUS AUTOFOCUS BASED ON FACE DETECTION AND TRACKING

PRIORITY

This application claims the benefit of priority to U.S. provisional patent application No. 61/387,449, filed Sep. 28, 2010.

BACKGROUND

Digital cameras today often include an auto focus mechanism. Two kinds of conventional auto focus mechanisms are contrast detect auto focus and phase detect auto focus.

Contrast Detect Auto Focus

With contrast detect auto focus, the camera lens is initially positioned at a closest focus point. The lens is incrementally shifted and image sharpness is evaluated at each step. When a peak in sharpness is reached, the lens shifting is stopped. Contrast detect auto focus is used in conventional digital stills cameras or DSCs, camcorders camera phones, webcams, and surveillance cameras. They are very precise, based on pixel level measurements and fine scanning. They can focus anywhere inside a frame, but they typically only focus around the center of the frame. However, contrast detect auto focus mechanisms are slow, because they involve scanning a focus range. Also, they do not allow tracking of an acquired subject. Further scanning is involved to determine whether the subject has moved to front or back focus, known as focus hunting. Contrast detect auto focus mechanisms are typically inexpensive and rugged.

Phase Detect Auto Focus

Figure 1:
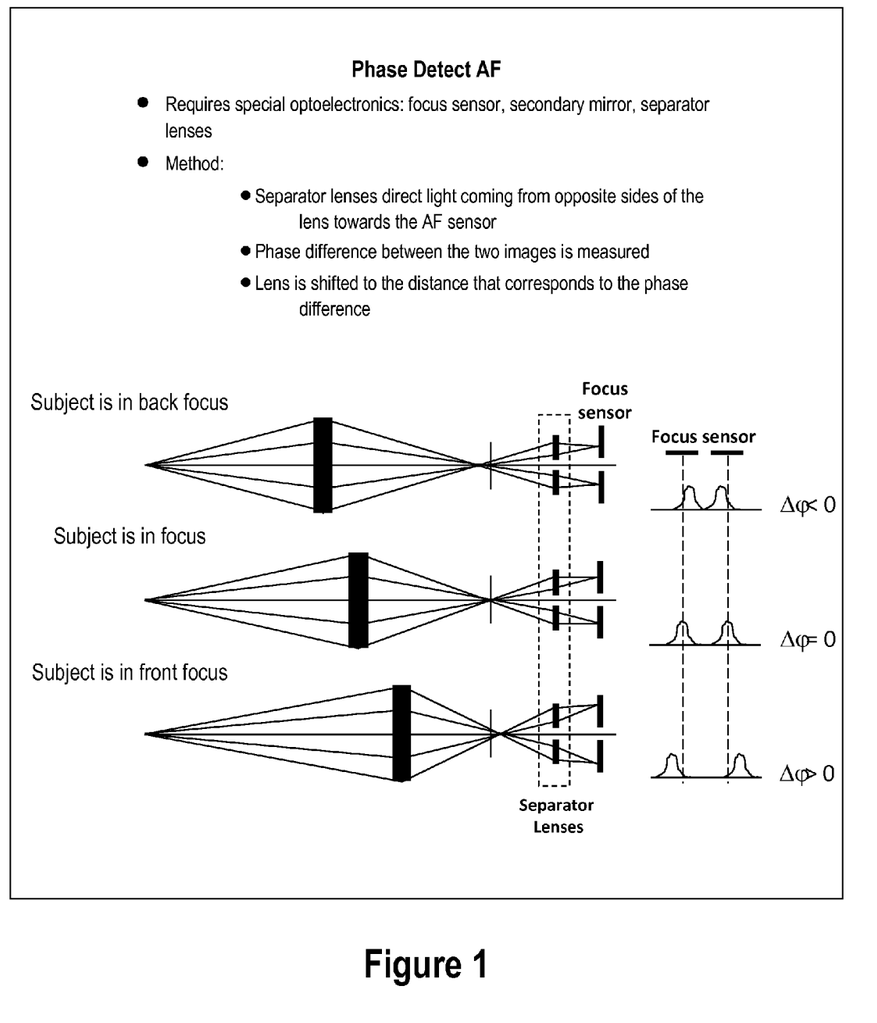
FIG. 1 illustrates a conventional phase detect auto focus mechanism.

Phase detect auto focus generally involves special opto-electronics including a secondary mirror, separator lenses and a focus sensor. The separator lenses direct light coming from opposite sides of the lens towards the auto focus sensor. A phase difference between the two images is measured. The lens is shifted to the distance that corresponds to the phase difference. Phase detect auto focus is used in conventional single lens reflex cameras or SLRs. These are generally less precise than contrast detect autofocus mechanisms, because the phase difference cannot always be assessed very accurately. They can only acquire focus in fixed points inside a frame, and these are typically indicated manually by a camera user. They are typically fast, as relative positions of the subject can be detected by single measurements. They allow tracking, as it can determine whether the subject has moved to front or back focus, but only by hopping from one focus point to another. Phase detect auto focus mechanisms are typically expensive and fragile. FIG. 1 illustrates how a phase detect auto focus mechanism works, i.e., when the phase difference is zero as in the middle graphic, then the subject is understood to be in focus.

It is desired to have an improved auto focus mechanism that does not have the significant drawbacks of either of the contrast detect and phase detect auto focus mechanisms. United States published patent application no. 20100208091, incorporated by reference, describes a camera that detects a face in an image captured by the camera, and calculates the size of the face. It selects from amongst a number of previously stored face sizes, one that is closest to the calculated face size. It retrieves a previously stored lens focus position that is associated with the selected, previously stored face size. It signals a moveable lens system of the digital camera to move to a final focus position given by the retrieved, previously stored lens focus position. A problem with the technique described in the 20100208091 published US patent application is that it will have a significantly high rate of non-detection of faces due to their blurry, out of focus state. Unless a further enhancement is provided, this will result in an unsatisfactorily slow image capture process.

DETAILED DESCRIPTION OF THE EMBODIMENTS

An autofocus method is provided for a digital image acquisition device based on face detection. The method involves use of a lens, image sensor and processor of the device. A digital image is acquired of a scene that includes one or more out of focus faces and/or partial faces. The method includes detecting one or more of the out of focus faces and/or partial faces within the digital image by applying one or more sets of classifiers trained on faces that are out of focus. One or more sizes of the one of more respective out of focus faces and/or partial faces is/are determined within the digital image. One or more respective depths is/are determined to the one or more out of focus faces and/or partial faces based on the one or more sizes of the one of more faces and/or partial faces within the digital image. One or more respective focus positions of the lens is/are adjusted to focus approximately at the determined one or more respective depths. One or more further images is/are acquired of scenes that include at least one of the one or more faces and/or partial faces with the lens focused at the one or more respectively adjusted focus positions. Upon adjusting the one or more respective focus positions, the method may further include performing a fine scan, and fine adjusting the one or more respective focus positions based on the fine scan. The scene may include at least one out of focus face and/or partial face not detected by applying the one or more sets of face classifiers, and wherein the method further comprises applying a contrast detect scan or a phase detect scan or both for acquiring said at least one out of focus face or partial face or both not detected by applying said one or more sets of classifiers trained on faces that are out of focus.

The one or more partial faces may include an eye region.

The method may include adjusting at least one of the one or more respective focus positions when at least one of the one or more faces and/or partial faces changes size at least a threshold amount. The method may also include tracking the at least one of the faces and/or partial faces, and determining the change in size of the at least one of the one or more faces and/or partial faces based on the tracking.

The method may further include increasing depth of field by stopping down the aperture of the digital image acquisition device.

The one or more faces and/or partial faces may include multiple faces and/or partial faces located respectively at multiple different depths approximately determined based on their different determined sizes.

The determining of the one or more depths may include assigning at least one average depth corresponding to at least one of the one or more determined sizes.

The determining of the one or more depths may include recognizing a detected face or partial face or both as belonging to a specific individual, calling a known face or partial face spatial parameter from a memory that corresponds to the specific face or partial face or both, and determining a depth corresponding to a determined size and the known face or partial face spatial parameter.

The adjusting of the one or more respective focus positions may utilize a MEMS (microelectromechanical system) component.

One or more processor readable media are also provided that have code embodied therein for programming a processor to perform any of the methods described herein.

A digital image acquisition device is also provided including a lens, an image sensor, a processor and a memory that has code embedded therein for programming the processor to perform any of the methods described herein.

Normal contrast detect autofocus is slow and hunts when a subject moves out of focus. Falling back to contrast detect auto focus, when a blurry face is not detected, could too often slow the process provided by the 20100208091 publication. A method that uses face detection to speed up focusing and reduce focus hunting in continuous autofocus is provided. Highly reliable face detection is first of all provided even when the face is not in focus by providing one or more sets of trained classifiers for out of focus faces and/or partial faces. For example, three sets of face classifiers may be provided: one trained to sharp faces, another trained to somewhat blurry faces, and a third trained to faces that are even more blurry and out of focus. A different number of classifier sets may be trained and used. This advantageous technique will have far fewer non-detection events than the technique of the 20100208091 publication, leading to a faster and more reliable image capture process. Face detection particularly by training face classifiers that may or may not be evenly illuminated, front facing and sharply-focused have been widely researched and developed by the assignee of the present application, e.g., as described at U.S. Pat. Nos. 7,362,368, 7,616,233, 7,315,630, 7,269,292, 7,471,846, 7,574,016, 7,440,593, 7,317,815, 7,551,755, 7,558,408, 7,587,068, 7,555,148, 7,564,994, 7,565,030, 7,715,597, 7,606,417, 7,692,696, 7,680,342, 7,792,335, 7,551,754, 7,315,631, 7,469,071, 7,403,643, 7,460,695, 7,630,527, 7,469,055, 7,460,694, 7,515,740, 7,466,866, 7,693,311, 7,702,136, 7,620,218, 7,634,109, 7,684,630, 7,796,816 and 7,796,822, and U.S. published patent applications nos. US 2006-0204034, US 2007-0201725, US 2007-0110305, US 2009-0273685, US 2008-0175481, US 2007-0160307, US 2008-0292193, US 2007-0269108, US 2008-0013798, US 2008-0013799, US 2009-0080713, US 2009-0196466, US 2008-0143854, US 2008-0220750, US 2008-0219517, US 2008-0205712, US 2009-0185753, US 2008-0266419, US 2009-0263022, US 2009-0244296, US 2009-0003708, US 2008-0316328, US 2008-0267461, US 2010-0054549, US 2010-0054533, US 2009-0179998, US 2009-0052750, US 2009-0052749, US 2009-0087042, US 2009-0040342, US 2009-0002514, US 2009-0003661, US 2009-0208056, US 2009-0190803, US 2009-0245693, US 2009-0303342, US 2009-0238419, US 2009-0238410, US 2010-0014721, US 2010-0066822, US 2010-0039525, US 2010-0165150, US 2010-0060727, US 2010-0141787, US 2010-0141786, US 2010-0220899, US 2010-0092039, US 2010-0188530, US 2010-0188525, US 2010-0182458, US 2010-0165140 and US 2010-0202707, which are all incorporated by reference.

Figure 2A:
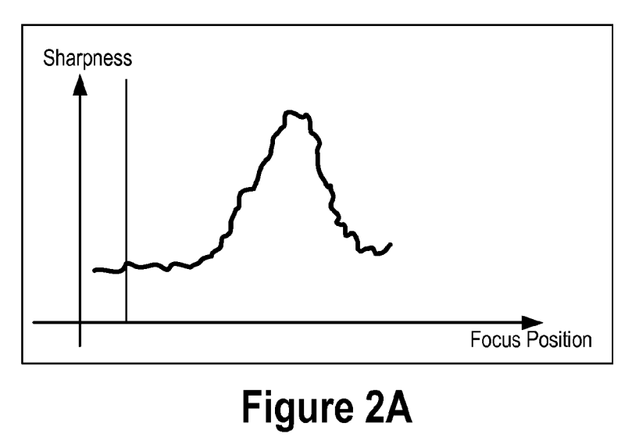
FIG. 2a is a plot of sharpness versus focus position of a lens in a digital image acquisition device in accordance with certain embodiments.
Figure 2B:
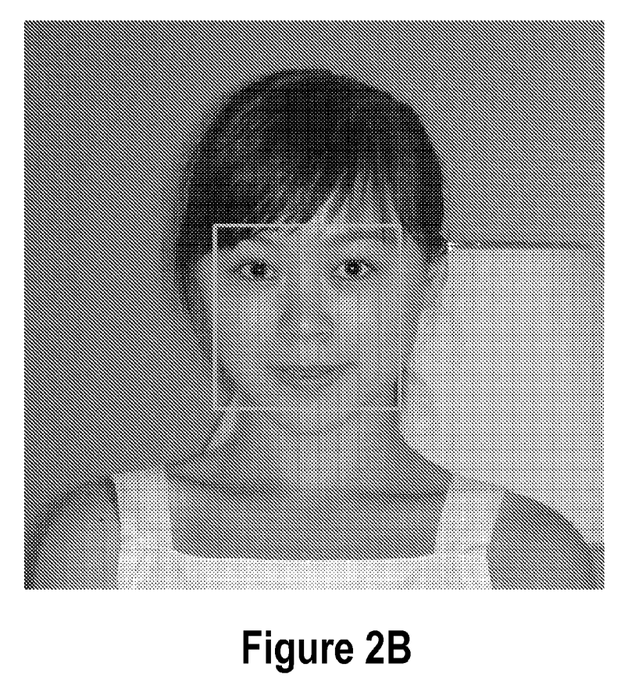
FIG. 2b illustrates a digital image including a face that is out of focus and yet still has a face detection box around a detected face region.

After detection of an out of focus face and/or partial face, the technique involves relying on face size to determine at which distance the subject is located. That is, when the focus position of lens is not disposed to provided an optimally sharp image at the value of the sharpness peak illustrated at FIG. 2a, then the subject face will be out of focus such as illustrated at FIG. 2b. With the advantageous classifiers trained to detect out of focus faces as provided herein, the blurry face illustrated at FIG. 2b is nonetheless detected as illustrated by the green rectangle.

Figure 3A:
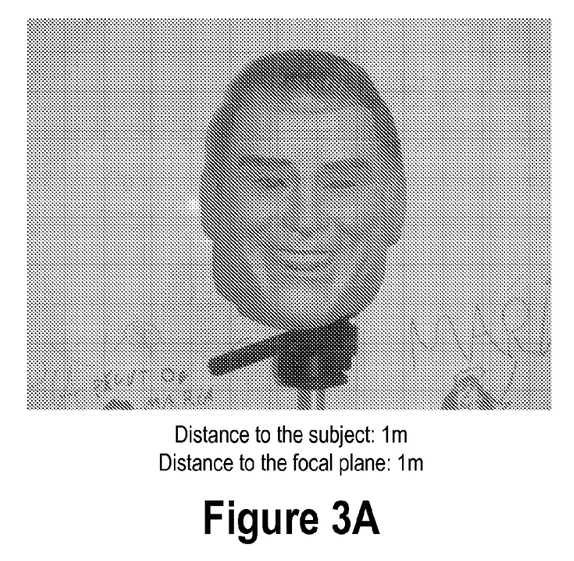
FIGS. 3a-3b illustrate a first example of digital images including sharp and out of focus faces, respectively, that are each detected in accordance with certain embodiments.
Figure 3B:
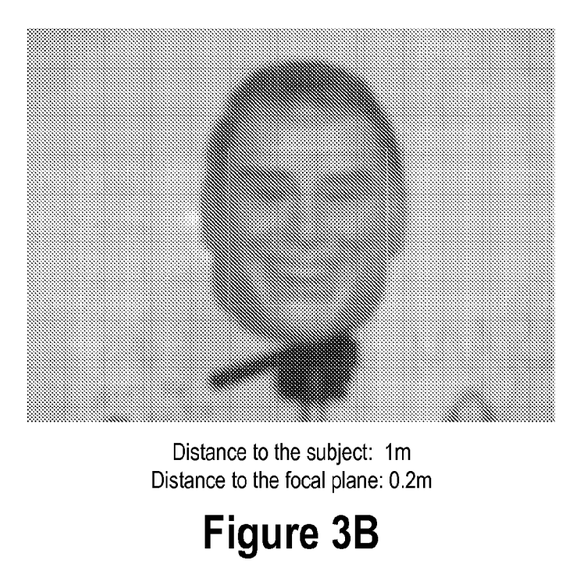

FIGS. 3a-3b illustrate a first example of digital images including sharp and out of focus faces, respectively, that are each detected in accordance with certain embodiments. In FIG. 3a, the distance to the subject is one meter and the distance to the focal plane is one meter, so the face is sharp and the focusing element does not need to be moved. In FIG. 3b, the distance to the subject is one meter, but the distance to the focal plane is 0.2 meters, so the face is blurry although advantageously still detected by using classifiers trained to detect blurry faces. The focusing element would be moved in accordance with these embodiments upon detection of the blurry face of FIG. 3b to focus at one meter instead of 0.2 meters due to estimating the distance to the face as being one meter based on the size of the detected face.

Figure 4A:
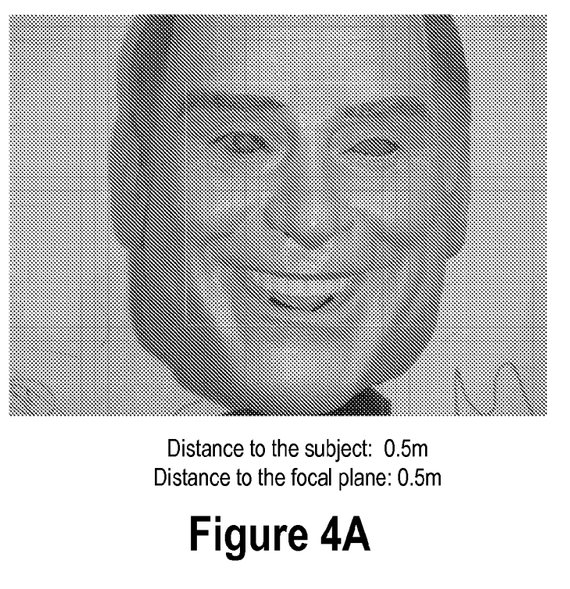
FIGS. 4a-4b illustrate a second example of digital images including sharp and out of focus faces, respectively, that are each detected in accordance with certain embodiments.
Figure 4B:
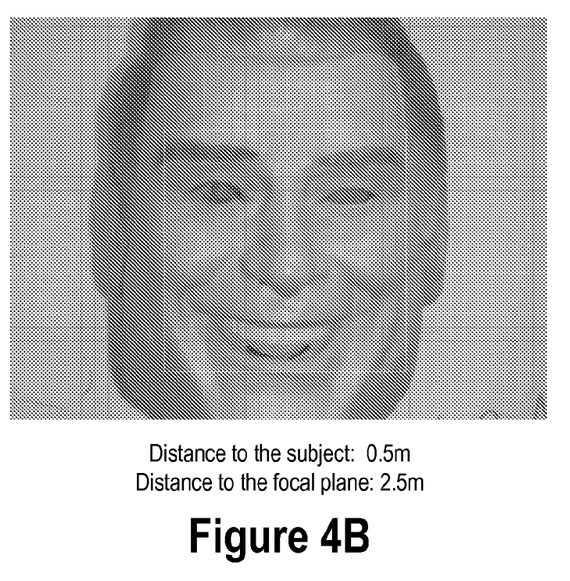

FIGS. 4a-4b illustrate a second example of digital images including sharp and out of focus faces, respectively, that are each detected in accordance with certain embodiments. In FIG. 4a, the distance to the subject is 0.5 meters and the distance to the focal plane is 0.5 meters, so the face is sharp and the focusing element does not need to be moved. In FIG. 4b, the distance to the subject is 0.5 meters, but the distance to the focal plane is 0.25 meters, so the face is blurry although advantageously still detected by using classifiers trained to detect blurry faces. Note that the focus is not as far off as in FIG. 3b, and so a different set of classifiers may be used trained to detect less blurry faces than those used to detect the face of FIG. 3b. The focusing element would be moved in accordance with these embodiments upon detection of the blurry face of FIG. 4b to focus at 0.5 meters instead of 0.25 meters due to estimating the distance to the face as being 0.5 meters based on the size of the detected face.

Figure 7:
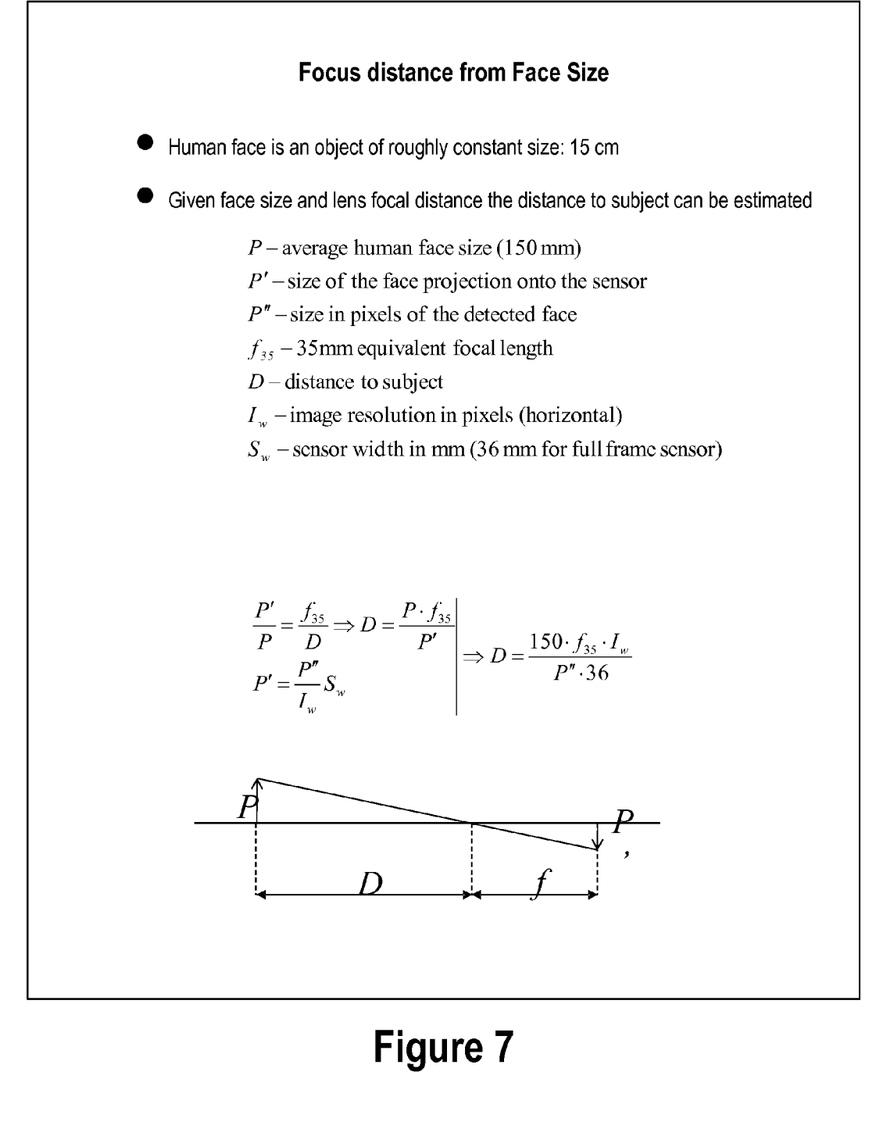
FIG. 7 illustrates a calculation of focus distance based on face size.
Figure 8A:
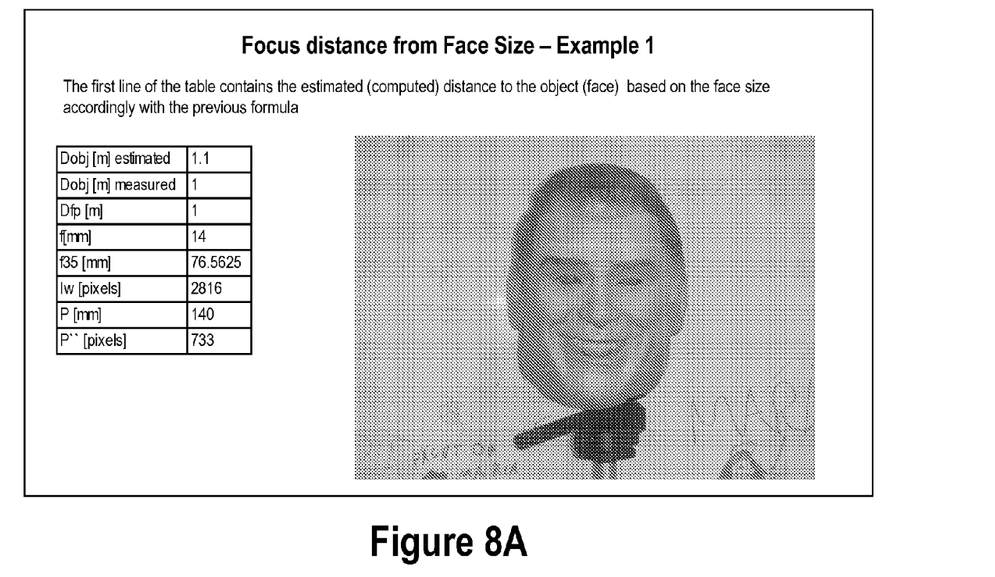
FIGS. 8a-8d illustrate digital images including relatively sharp faces 7a and 7c and relatively out of focus faces 7b and 7d.
Figure 8B:
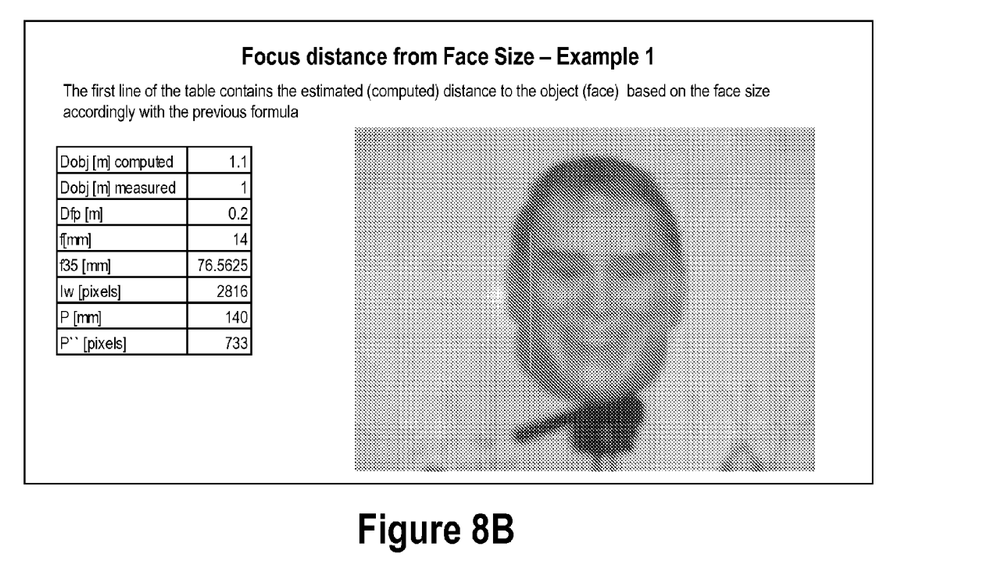
Figure 8C:
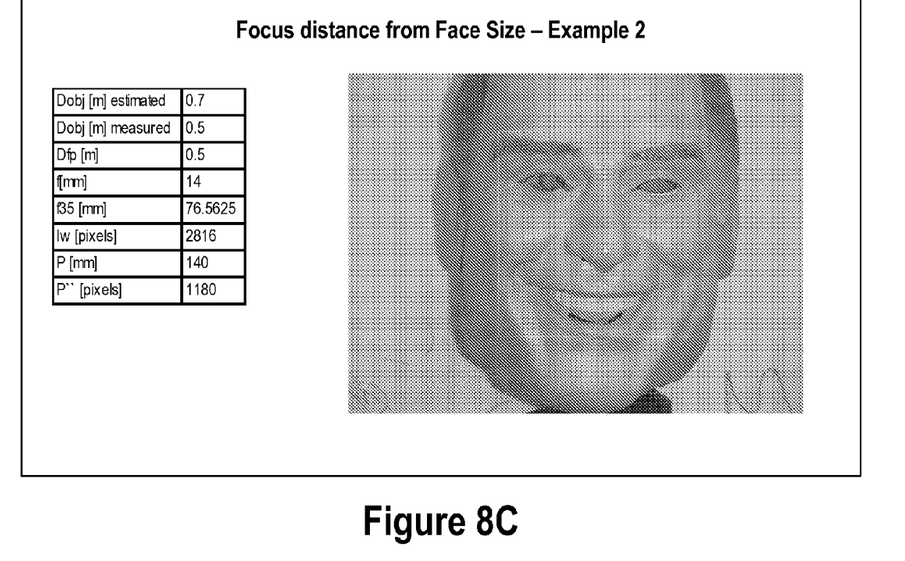
Figure 8D:
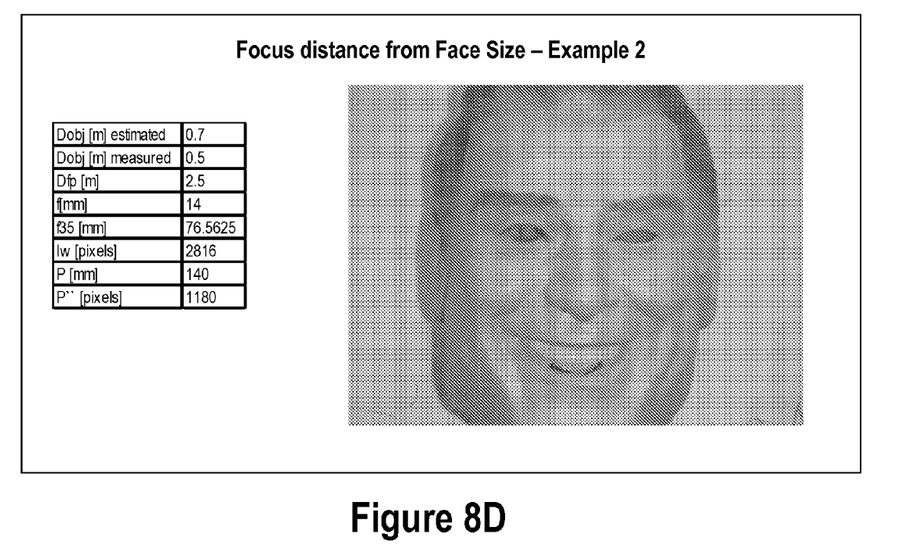

Once the distance to the subject is determined by computation or estimation in accordance with a look up table based for example on the formula provided at FIG. 7, the focusing element of the camera may be moved directly to a position that will cause it to focus on the corresponding distance without having to scan the entire focus range. Furthermore, in continuous mode, it can be determined whether the subject has moved in the direction of front or back focus by measuring the change in face size. This enables the movement of the focus element in the right direction, thus reducing focus hunt. The process can be sped up still further by utilizing MEMs technology, e.g., as set forth at any of U.S. Pat. Nos. 7,769, 281, 7,747,155, 7,729,603, 7,729,601, 7,702,226, 7,697,834, 7,697,831, 7,697,829, 7,693,408, 7,663,817, 7,663,289, 7,660,056, 7,646,969, 7,640,803, 7,583,006, 7,565,070, 7,560,679, 7,555,210, 7,545,591, 7,515,362, 7,495,852, 7,477,842, 7,477,400, 7,403,344, 7,359,131, 7,359,130, 7,345,827, 7,266,272, 7,113,688 and/or 6,934,087, which are hereby incorporated by reference. This idea can be generalized to any object that can be identified and tracked, even if its size is not known in advance.

As mentioned, a highly advantageous feature is provided whereby the face detection process is reliably performed on faces even when they are out of focus. This enables advantageous auto focus techniques in accordance with embodiments described herein to detect faces before actually starting to focus on them. Once a blurry, out of focus face is detected, a rough distance may be calculated to the subject. This is possible as human faces do not vary in size considerably. Further precision may be provided by using face recognition, whereby a specific person's face is recognized by comparison with other face data of the person stored in a database or by manual user indication or because one or more pictures have been recently taken of the same person or combinations of these and other face recognition techniques. Then, the specifically known face size of that person can be used.

The distance to subject may be calculated by also taking into account the focal length of the lens (and sensor size if this is not 35 mm equivalent). When the distance to subject is known, the focusing element may be directly moved to the corresponding position without any additional scanning. Then only a fine contrast-detect scan is optionally performed around that distance. The contrast is measured onto the face area or on the eye region of the face if the face is too large and/or only partially detected. This is advantageous to reduce the computational effort for calculating contrast. In video mode, the same may be performed every time focus is to be achieved on a new face. Once focus is achieved on a certain face, the variation in face size is monitored in accordance with certain embodiments. If the changes are not significant, the algorithm measures the contrast onto the face rectangle (or eye area or other partial face region) and if this does not drop below a certain value, the focus position is not adjusted. Conversely, if the contrast drops but the face size does not change, a fine refocusing may be done around the current focus distance. If the face size is found to change more than a certain margin, the new size is compared against the old size to determine whether the subject has moved in front or back focus. Based on this, the focusing element is moved towards the appropriate direction (back or forth), until focus is reacquired. Advantageously, focus tracking is provided without hunting. For example, if the face size has increased, it can be determined that the subject has moved in front focus, so the focusing element is moved so that it focuses closer.

This method can be generalized to any object of known size, as previously mentioned. For example face detection can be changed for pet detection. Furthermore, the method may be generalized to objects of unknown size. Once focus is acquired on a certain object using the normal contrast-detect and/or phase-detect algorithm, that object can be tracked and monitored with regard to its variations in size. The method involves determining whether the object has become larger or smaller and by how much, and continuous focusing is provided without hunting even on objects of unknown size.

Figure 5:
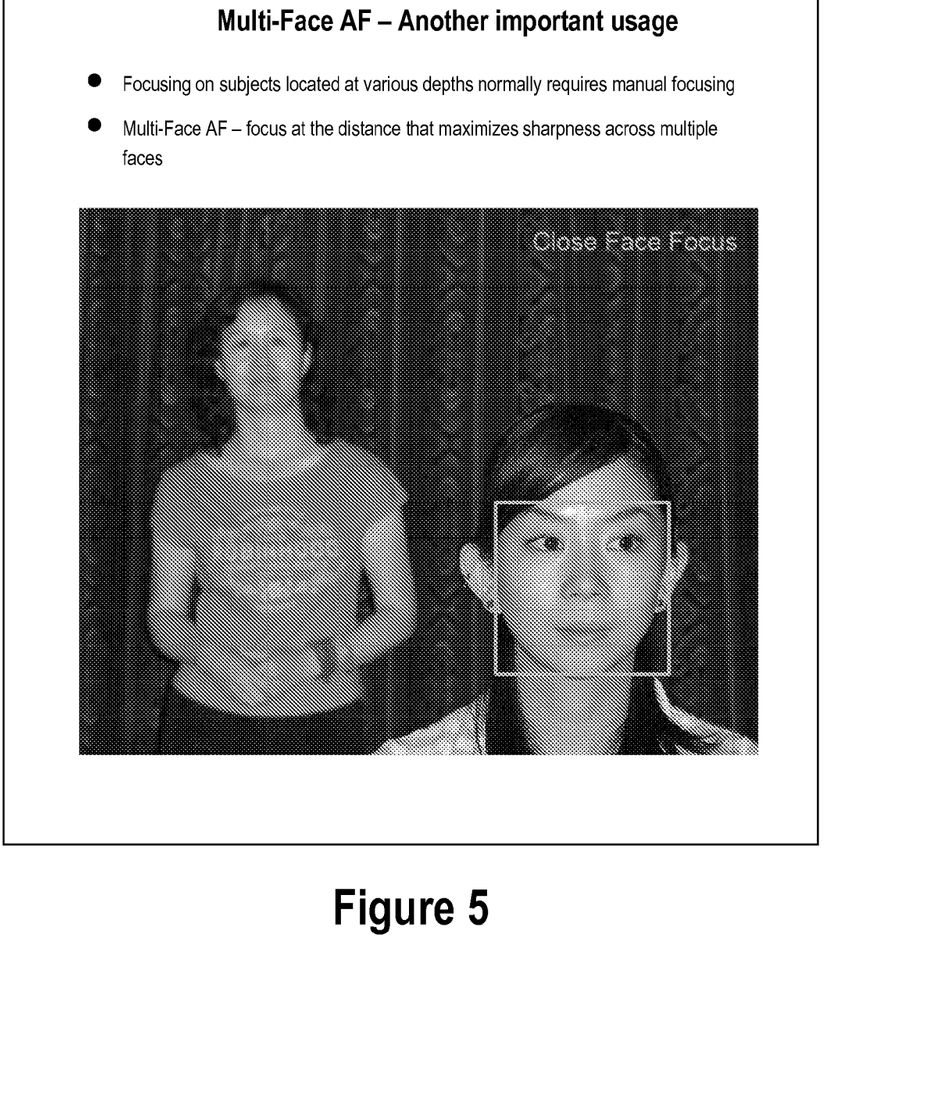
FIG. 5 illustrates a digital image including a sharp face and an out of focus face.

When a scene includes multiple faces as illustrated at FIG. 5, the multiple faces in the frame may be detected. The distances that correspond to the sizes of each of these faces are then calculated. The distances are sorted and stored for the multiple faces. A divide-et-impera style search may be performed across the focus distances. At each step, the COC diameter may be calculated for each of the distances given the lens aperture, focal length and focus distance. In one embodiment, a measure of global sharpness may be measured across the multiple faces given these diameters. The outcome of these searches will be a focus distance that would theoretically maximize sharpness across all faces in the photo. The lens will be focused directly at that distance and, if required, a fine scan sequence can be done to ensure even more precision. This technique could even be put in conjunction with an autoexposure technique so that if not enough depth of focus or DOF is available, the auto focus or AF algorithm can decide to stop down the aperture in order to increase DOF. Many other options are available, e.g., a composite image of sharp faces may be provided by rapid capture of multiple images: one image captured at each of the calculated focus positions, or a user may select when face to focus on, or the largest face may be focused on, among other possibilities. Weighting of faces is discussed in the earlier applications cited above.

Figure 6:
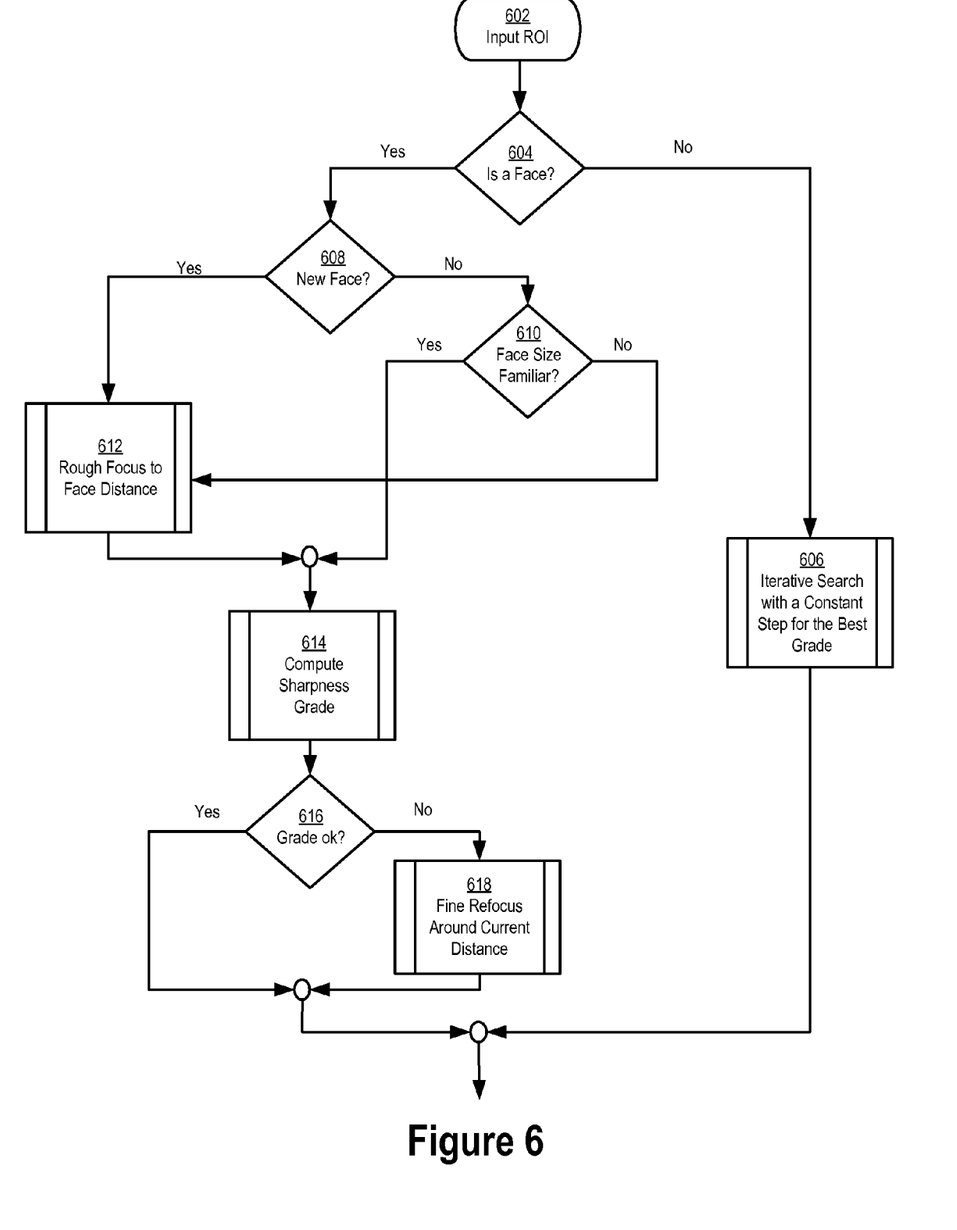
FIG. 6 is a flow chart illustrating a method in accordance with certain embodiments.

FIG. 6 is a flow diagram illustrating a method in accordance with certain embodiments. A region of interest or ROI is input at 602. It is determined at 604 whether the ROI is a face. If not, then at 606 an iterative search with a constant step is performed for the best grade. If a face is detected, then it is determined at 608 whether it is a new face. If not, then at 610 it is determined whether the face size is the same or close to the face size previously determined. If it is, then no focus adjustment is needed, but if the size of the previously detected face is determined to have changed size, then rough focus to face distance is performed at 612. If the detected face is determined to be a new face at 608, then the rough focus to face distance is performed at 612. A sharpness grade may be computed at 614. If the grade computed at 614 is determined to be OK at 616, then the process ends, but if the grade is not OK, then a fine refocus around the current distance is performed at 618.

FIG. 7 illustrates the computation of the distance to the subject. The distance to subject is proportional to the image resolution in pixels and to the 35 mm equivalent focal length in this embodiment, and inversely proportional to the size in pixels of the detected face. There is also a multiplier of 150/36. FIGS. 8a-8d simply show examples of different distances of faces and focus depths, with the first line of the table at left in each showing the computed or estimated distance to object/subject based on the calculation illustrated at FIG. 7.

Figure 9:
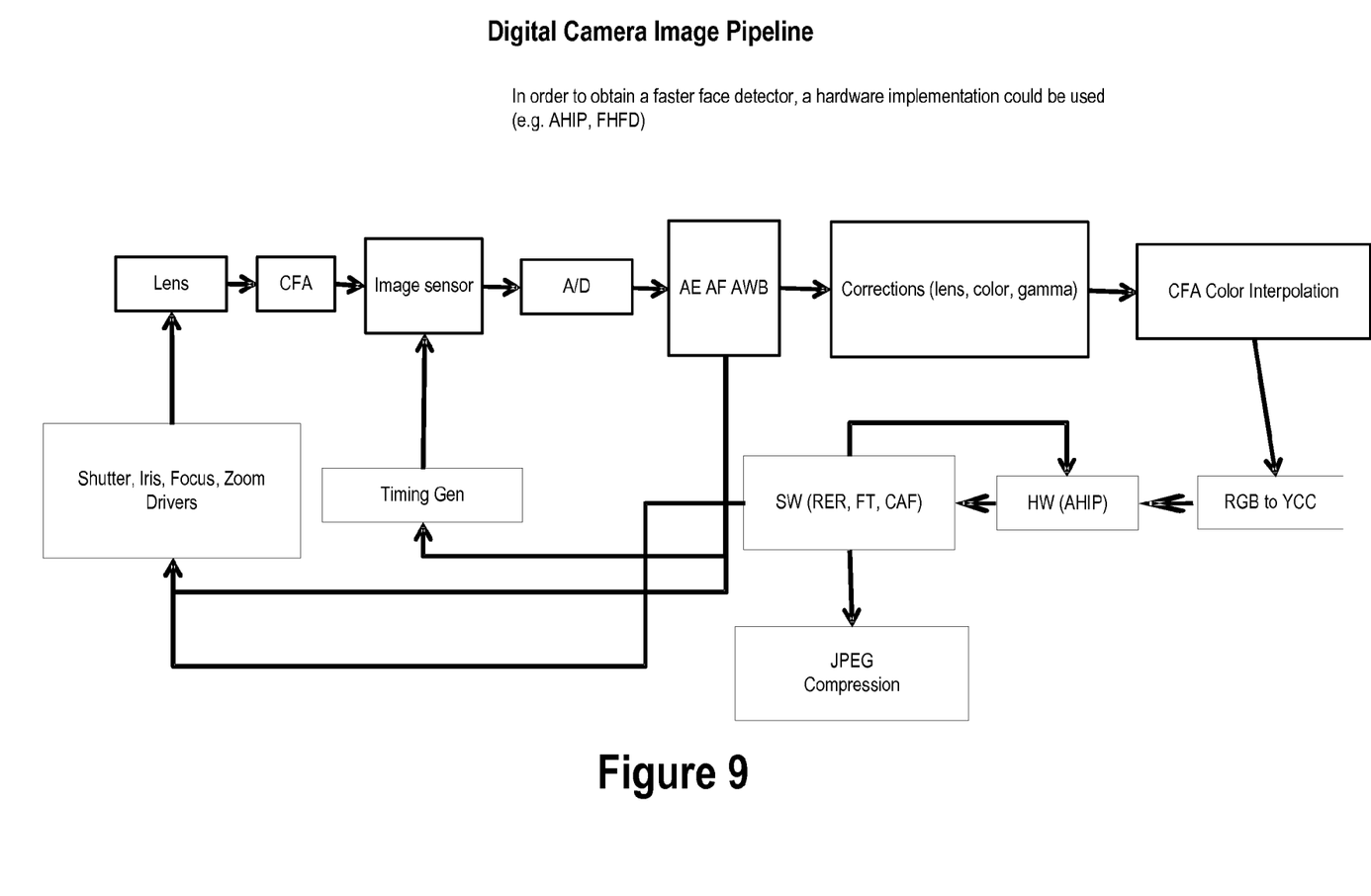
FIG. 9 illustrates a digital camera image pipeline in accordance with certain embodiments.

A digital camera image pipeline is illustrated at FIG. 9. U.S. provisional patent application Ser. No. 61/362,247 is incorporated by reference as disclosing details of an acceleration by hardware implementation that may be used to obtain still faster face detection.

The technique in accordance with embodiment described herein scores high in many categories. For example, it is fast, requires very low power and produces very low motor wear. In video mode, it knows whether the subject has moved in front or back focus, so it does not need to hunt. This feature can enable continuous autofocus in movie mode for DSCs and camera phones, which is something that is not available in current technologies. Furthermore, the technique does not require any additional hardware so it is cheap to implement, and it is rugged (passes any drop test) and does all this without compromising the quality of the focus in any way. It also highly accurate. Multiface autofocus is also provided which enables the camera to focus on multiple faces, located at various depths. With multiface AF in accordance with embodiments described herein, this can be done by assessing the sizes of the faces, calculating the distance to each of the faces and then deciding on a virtual focus distance that maximizes sharpness across all these faces or otherwise as described above. Moreover, the focus will then be achieved almost instantly, without having to scan the focus range or measure sharpness on multiple areas in the image, i.e., this can otherwise be very slow if together they cover a large area of the frame.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

In addition, all references cited above and below herein, as well as the background, invention summary, abstract and brief description of the drawings, are all incorporated by reference into the detailed description of the preferred embodiments as disclosing alternative embodiments.

What is claimed is:

1. An autofocus method for a digital image acquisition device based on face detection, comprising:
   using a lens, image sensor and processor of a digital image acquisition device to acquire a digital image of a scene that includes one or more out of focus faces;
   detecting the one or more out of focus faces within the digital image by using one or more sets of classifiers trained on faces that are out of focus, wherein the one or more sets of classifiers are reference parameters that are calibrated to reference criteria including at least a set of faces that are out of focus;
   determining one or more sizes of the one of more respective out of focus faces within the digital image;
   determining one or more respective depths to the one or more out of focus faces based on the one or more sizes of the one of more out of focus faces within the digital image;
   adjusting one or more respective focus positions of the lens to focus approximately at the determined one or more respective depths; and
   acquiring one or more further images of scenes that include at least one of the one or more out of focus faces with the lens focused at the one or more respectively adjusted focus positions.

2. The method of claim 1, further comprising, upon adjusting the one or more respective focus positions, performing a fine scan, and fine adjusting the one or more respective focus positions based on the fine scan.

3. The method of claim 2, wherein the scene comprises at least one out of focus face not detected by using said one or more sets of face classifiers, and wherein the method further comprises applying a contrast detect scan or a phase detect scan or both for acquiring said at least one out of focus face not detected by using said one or more sets of face classifiers.

4. The method of claim 1, further comprising adjusting at least one of the one or more respective focus positions when at least one of the one or more out of focus faces changes size at least a threshold amount.

5. The method of claim 4, further comprising tracking the at least one of the out of focus faces, and determining the change in size of the at least one of the one or more out of focus faces based on the tracking.

6. The method of claim 1, further comprising increasing depth of field by increasing f-stop number to decrease the aperture of the digital image acquisition device.

7. The method of claim 1, wherein the one or more out of focus faces comprise multiple faces located respectively at multiple different depths approximately determined based on their different determined sizes.

8. The method of claim 1, wherein the step of determining of the one or more depths comprises assigning at least one average depth corresponding to at least one of the one or more determined sizes.

9. The method of claim 1, wherein the step of determining of the one or more depths comprises recognizing a detected face as belonging to a specific individual, calling a known face spatial parameter from a memory that corresponds to the specific face, and determining a depth corresponding to a determined size and the known face spatial parameter.

10. The method of claim 1, wherein the step of adjusting one or more respective focus positions comprises utilizing a MEMS (microelectromechanical system) component.

11. One or more non-transitory processor readable media having code embodied therein for programming a processor to perform an autofocus method for a digital image acquisition device based on face detection, wherein the device has a processor and uses a lens and image sensor to acquire a digital image of a scene that includes one or more out of focus faces, wherein the method comprises:
   detecting the one or more out of focus faces within the digital image by using one or more sets of classifiers trained on faces that are out of focus, wherein the one or more sets of classifiers are reference parameters that are calibrated to reference criteria including at least a set of faces that are out of focus;
   determining one or more sizes of the one of more respective out of focus faces within the digital image;
   determining one or more respective depths to the one or more out of focus faces based on the one or more sizes of the one of more out of focus faces within the digital image;
   adjusting one or more respective focus positions of the lens to focus approximately at the determined one or more respective depths; and acquiring one or more further images of scenes that include at least one of the one or more out of focus faces with the lens focused at the one or more respectively adjusted focus positions.

12. The one or more processor-readable media of claim 11, wherein the method further comprises, upon adjusting the one or more respective focus positions, performing a fine scan, and fine adjusting the one or more respective focus positions based on the fine scan.

13. The one or more processor-readable media of claim 12, wherein the scene comprises at least one out of focus face not detected by using said one or more sets of face classifiers, and wherein the method further comprises applying a contrast detect scan or a phase detect scan or both for acquiring said at least one out of focus face not detected by using said one or more sets of face classifiers.

14. The one or more processor-readable media of claim 11, wherein the method further comprises adjusting at least one of the one or more respective focus positions when at least one of the one or more out of focus faces changes size at least a threshold amount.

15. The one or more processor-readable media of claim 14, wherein the method further comprises tracking the at least one of the out of focus faces, and determining the change in size of the at least one of the one or more out of focus faces based on the tracking.

16. The one or more processor-readable media of claim 11, wherein the method further comprises increasing depth of field by increasing f-stop number to decrease the aperture of the digital image acquisition device.

17. The one or more processor-readable media of claim 11, wherein the one or more out of focus faces comprise multiple faces located respectively at multiple different depths approximately determined based on their different determined sizes.

18. The one or more processor-readable media of claim 11, wherein the step of determining of the one or more depths comprises assigning at least one average depth corresponding to at least one of the one or more determined sizes.

19. The one or more processor-readable media of claim 11, wherein the step of determining of the one or more depths comprises recognizing a detected face as belonging to a specific individual, calling a known face spatial parameter from a memory that corresponds to the specific face, and determining a depth corresponding to a determined size and the known face spatial parameter.

20. The one or more processor-readable media of claim 11, wherein the step of adjusting one or more respective focus positions comprises utilizing a MEMS (microelectromechanical system) component.

21. A digital image acquisition device including a lens, an image sensor, a processor and a memory having code embedded therein for programming the processor to perform an autofocus method based on face detection, wherein the method comprises:

acquiring a digital image of a scene that includes one or more out of focus faces;

detecting the one or more out of focus faces within the digital image by using one or more sets of classifiers trained on faces that are out of focus, wherein the one or more sets of classifiers are reference parameters that are calibrated to reference criteria including at least a set of faces that are out of focus;

determining one or more sizes of the one of more respective out of focus faces within the digital image;

determining one or more respective depths to the one or more out of focus faces based on the one or more sizes of the one of more out of focus faces within the digital image;

adjusting one or more respective focus positions of the lens to focus approximately at the determined one or more respective depths; and acquiring one or more further images of scenes that include at least one of the one or more out of focus faces with the lens focused at the one or more respectively adjusted focus positions.

22. The device of claim 21, wherein the method further comprises, upon adjusting the one or more respective focus positions, performing a fine scan, and fine adjusting the one or more respective focus positions based on the fine scan.

23. The device of claim 22, wherein the scene comprises at least one out of focus face not detected by using said one or more sets of face classifiers, and wherein the method further comprises applying a contrast detect scan or a phase detect scan or both for acquiring said at least one out of focus face not detected by using said one or more sets of face classifiers.

24. The device of claim 21, wherein the method further comprises adjusting at least one of the one or more respective focus positions when at least one of the one or more out of focus faces changes size at least a threshold amount.

25. The device of claim 24, wherein the method further comprises tracking the at least one of the out of focus faces, and determining the change in size of the at least one of the one or more out of focus faces based on the tracking.

26. The device of claim 21, wherein the method further comprises increasing depth of field by increasing f-stop number to decrease the aperture of the digital image acquisition device.

27. The device of claim 21, wherein the one or more out of focus faces comprise multiple faces located respectively at multiple different depths approximately determined based on their different determined sizes.

28. The device of claim 21, wherein the determining of the one or more depths comprises assigning at least one average depth corresponding to at least one of the one or more determined sizes.

29. The device of claim 21, wherein the determining of the one or more depths comprises recognizing a detected face as belonging to a specific individual, calling a known face spatial parameter from a memory that corresponds to the specific face, and determining a depth corresponding to a determined size and the known face spatial parameter.

30. The device of claim 21, wherein the adjusting one or more respective focus positions comprises utilizing a MEMS (microelectromechanical system) component.

* * * * *

UNITED STATES PATENT AND TRADEMARK OFFICE
CERTIFICATE OF CORRECTION

PATENT NO.         : 8,970,770 B2                                                  Page 1 of 1
APPLICATION NO.    : 12/959320
DATED              : March 3, 2015
INVENTOR(S)        : Florin Nanu, Cosmin Nicolae Stan and Peter Corcoran It is certified that error appears in the above-identified patent and that said Letters Patent is hereby corrected as shown below:

In the Claims

Claim 8, column 8, line 19, delete "of the one" and insert --the one--

Claim 9, column 8, line 23, delete "of the one" and insert --the one--

Claim 18, column 9, line 22, delete "of the one" and insert --the one--

Claim 19, column 9, line 26, delete "of the one" and insert --the one--

Signed and Sealed this
Twenty-third Day of June, 2015

Michelle K. Lee
*Director of the United States Patent and Trademark Office*